US011411986B2

(12) United States Patent
Dudouit

(10) Patent No.: US 11,411,986 B2
(45) Date of Patent: Aug. 9, 2022

(54) METHOD AND DATA PACKET CLEANING SYSTEM FOR SCREENING DATA PACKETS RECEIVED AT A SERVICE INFRASTRUCTURE

(71) Applicant: OVH, Roubaix (FR)

(72) Inventor: Aurelien Dudouit, Villeurbanne (FR)

(73) Assignee: OVH, Roubaix (FR)

( * ) Notice: Subject to any disclaimer, the term of this patent is extended or adjusted under 35 U.S.C. 154(b) by 254 days.

(21) Appl. No.: 16/674,821

(22) Filed: Nov. 5, 2019

(65) Prior Publication Data
US 2020/0162507 A1      May 21, 2020

(30) Foreign Application Priority Data

Nov. 15, 2018   (EP) .................................... 18315043

(51) Int. Cl.
*H04L 29/06* (2006.01)
*H04L 9/40* (2022.01)
(Continued)

(52) U.S. Cl.
CPC ........ *H04L 63/1458* (2013.01); *H04L 43/028* (2013.01); *H04L 43/16* (2013.01); *H04L 45/70* (2013.01); *H04L 45/745* (2013.01); *H04L 47/32* (2013.01); *H04L 63/1408* (2013.01); *H04L 2463/141* (2013.01)

(58) Field of Classification Search
CPC ....... H04L 43/50; H04L 43/028; H04L 43/16; H04L 45/70; H04L 45/745; H04L 45/74; H04L 63/1408; H04L 63/1416; H04L 63/1466; H04L 63/0236; H04L 63/145; H04L 69/22; H04L 63/1458; H04L 47/32; H04L 2463/141

See application file for complete search history.

(56) References Cited

U.S. PATENT DOCUMENTS 7,222,366 B2   5/2007  Bruton et al.
7,512,980 B2   3/2009  Copeland et al.
(Continued)

OTHER PUBLICATIONS

Office action with regard to the counterpart CN Patent Application No. 201911112665.0 dated Feb. 25, 2022, and English Translation.
(Continued)

*Primary Examiner* — Jungwon Chang
(74) *Attorney, Agent, or Firm* — BCF LLP

(57) ABSTRACT

A data packet received at a service infrastructure is screened by a data packet cleaning system that successively applies each signature of a set of signatures as a mask to a predetermined area of a content of the data packet. If there is a byte-for-byte match between the predetermined area of the content and one of the signatures, an action corresponding to the matched signature is taken. The action is selected from unconditionally forwarding the data packet toward a server of the service infrastructure, unconditionally discarding the data packet, forwarding the data packet toward the server of the service infrastructure if a current flow of data packets being forwarded to the server is less than a flow threshold, and discarding the data packet if the current flow of data packets being forwarded to the server meets or exceeds the flow threshold.

16 Claims, 13 Drawing Sheets

(51) Int. Cl.
*H04L 43/028* (2022.01)
*H04L 43/16* (2022.01)
*H04L 45/00* (2022.01)
*H04L 45/745* (2022.01)
*H04L 47/32* (2022.01)

(56) References Cited

U.S. PATENT DOCUMENTS

| | | |
|---|---|---|
| 7,852,767 B2 | 12/2010 | Twiss |
| 8,020,207 B2 | 9/2011 | Chow et al. |
| 8,065,729 B2 | 11/2011 | Sung et al. |
| 8,301,802 B2 | 10/2012 | Wei et al. |
| 9,094,288 B1 | 7/2015 | Nucci et al. |
| 9,430,646 B1 | 8/2016 | Mushtaq et al. |
| 9,661,020 B2 | 5/2017 | Holloway et al. |
| 9,935,974 B2 | 4/2018 | Jain |
| 10,038,715 B1 | 7/2018 | Majkowski |
| 2005/0005017 A1 | 1/2005 | Ptacek et al. |
| 2008/0127324 A1 | 5/2008 | Seo et al. |
| 2009/0086651 A1* | 4/2009 | Luft .............. H04L 41/5067 370/253 |
| 2010/0125900 A1* | 5/2010 | Dennerline ........ H04L 63/1416 726/13 |
| 2010/0251364 A1* | 9/2010 | Lee .............. H04L 63/145 726/22 |
| 2011/0069620 A1* | 3/2011 | Gintis ................ H04L 43/50 370/250 |
| 2011/0153811 A1 | 6/2011 | Jeong et al. |
| 2013/0136127 A1* | 5/2013 | Hill .................. H04L 45/74 370/392 |
| 2014/0189867 A1 | 7/2014 | Jung et al. |
| 2014/0359764 A1 | 12/2014 | Dubrovsky et al. |
| 2015/0215285 A1* | 7/2015 | Fleury .............. H04L 67/10 726/13 |
| 2017/0070531 A1 | 3/2017 | Huston et al. |
| 2017/0099310 A1 | 4/2017 | Di Pietro et al. |
| 2019/0052553 A1* | 2/2019 | Subramanian ........ H04L 69/22 |

OTHER PUBLICATIONS

Extented European Search Report with regard to the counterpart EP Patent Application No. 18315043.2 completed Apr. 29, 2019.
Limwiwatkul et al., "Distributed Denial of Service Detection using TCP/IP Header and Traffic Measurement Analysis", International Symposium of Communications and Information Technologies 2004 (ISCIT 2004), Japan, https://ieeexplore.ieee.org/document/1412917, pp. 605-610.
Hussain et al., "A Framework for Classifying Denial of Service Attacks", SIGCOMM '03 Proceedings of the 2003 conference on Applications, technologies, architectures, and protocols for computer communications, 2003, Germany, https://dl.acm.org/citation.cfm?id=863968, pp. 99-110.
Bardas et al., "Classification of UDP Traffic for DDoS Detection", LEET'12 Proceedings of the 5th USENIX conference on Large-Scale Exploits and Emergent Threats, 2012, San Jose, CA, https://dl.acm.org/citation.cfm?id=2228340.2228350, pp. 1-8.
Mahoney et al., "PHAD: Packet Header Anomaly Detection for Identifying Hostile Network Traffic", ResearchGate, 2002, https://www.researchgate.net/publication/2834600_PHAD_Packet_Header_Anomaly_Detection_for_Identifying_Hostile_Network_Traffic, pp. 1-17.
Hoque et al., "Real-time DDoS attack detection using FPGA", Computer Communications 110, 2017, https://www.sciencedirect.com/, pp. 48-58.

* cited by examiner

METHOD AND DATA PACKET CLEANING SYSTEM FOR SCREENING DATA PACKETS RECEIVED AT A SERVICE INFRASTRUCTURE

CROSS-REFERENCE

The present application claims priority from European Patent Application no 18315043.2 filed on Nov. 15, 2018, the disclosure of which is incorporated by reference herein.

FIELD

The present technology relates to Internet security. In particular, disclosed data packet cleaning system and method are useable to screen data packets received at a service infrastructure.

BACKGROUND

Data centers and cloud infrastructure integrate many servers that provide mutualized hosting services to large numbers of clients. A service infrastructure may for example include hundreds of thousands of servers and host services for millions of clients. Data centers and cloud service providers are frequently victims of attacks such as, for example, denial-of-service attacks. Malicious data packets sent in large volumes by one of more sources are directed to a target infrastructure (i.e. a victim of the attack). In particular but without limitation, these data packets are frequently sent using the user datagram protocol (UDP). UDP is a legitimate protocol that is ideally suited for exchange of real-time information, including for example for playing games using game servers hosted on the infrastructure. Unfortunately, at least in part because UDP is a connectionless protocol in the sense that no connection needs to be established and maintained between the source and the destination of a UDP data packet, it is simple for a malicious source to emit so-called 'spoofed' UDP data packets in which information that should normally identify the source of the data packet is replaced with fake information. In this way, received UDP data packets may appear to have been sent from a legitimate source, based on fake source Internet Protocol (IP) addresses in headers of the UDP data packets. Malicious users may also send data packets using the transmission control protocol (TCP) and cause damages to a service infrastructure.

A firewall may be used to block some of the traffic incoming into a service infrastructure. Firewalls operate at the level of a network layer, which is the layer 3 of the Open Systems Interconnection (OSI) model. They can pass or block incoming data packets based on rules applied on headers of the received data packets. A firewall may for example accept or deny a received data packet based on a content of its header, including a source IP address, a destination IP address, a protocol indicator, (e.g. designating TCP or UDP), a source port, and a destination port. The firewall may filter a data packet based on any of these parameters or on any combination of these parameters. Firewalls are very useful but their capability to block illegitimate traffic is limited. For example, a firewall may accept an incoming UDP data packet containing a fake source IP address so that the UDP data packet only appears to be emitted from a legitimate source.

A problem that needs to be solved is how to rapidly and efficiently discover whether or not a received data packet is illegitimate as it may have been sent by a malicious source as a part of an attack.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) slow and inefficient discovery of illegitimate data packets; and/or (2) lack of solutions applicable to connectionless protocols.

In one aspect, various implementations of the present technology provide a method for detecting illegitimate data packets at a service infrastructure. The method comprises:
  receiving a data packet at the service infrastructure, the data packet comprising a header and a content;
  successively applying each signature of a set of signatures as a mask to a predetermined area of the content; and
  if there is a byte-for-byte match between the predetermined area of the content and one of the signatures of the set of signatures, taking an action corresponding to the one of the signatures, the action being selected from:
    unconditionally forwarding the data packet toward a server of the service infrastructure,
    unconditionally discarding the data packet,
    forwarding the data packet toward the server of the service infrastructure if a current flow of data packets being forwarded to the server is less than a flow threshold, and
    discarding the data packet if the current flow of data packets being forwarded to the server meets or exceeds the flow threshold.

In some implementations of the present technology, the method further comprises associating, in a database of the infrastructure, a specific action in relation to each signature of the set of signatures.

In some implementations of the present technology, the method further comprises selecting the set of signatures among a plurality of sets of signatures stored in the database based on a destination address and a destination port identified in the header of the data packet, the destination address designating the server of the service infrastructure, the destination address and the destination port together identifying a service hosted in the service infrastructure.

In some implementations of the present technology, the flow threshold is selected from a destination-based flow threshold for the destination address and the destination port and a signature-based flow threshold for the one of the signatures.

In some implementations of the present technology, the method further comprises, receiving a successive data packet at the service infrastructure, the successive data packet comprising a successive header and a successive content, the successive header containing a destination address designating the server; successively applying each signature of the set of signatures as a mask to a predetermined area of the successive content; and if there is no byte-for-byte match between the predetermined area of the content and one of the signatures of the set of signatures, determining if there is an available space in the set of signatures.

In some implementations of the present technology, the method further comprises, if there is no available space in the set of signatures, comparing the current flow of data packets being forwarded to the server to a generic flow threshold; forwarding the successive data packet toward the server of the service infrastructure if the current flow of data packets being forwarded to the server is less than the generic flow threshold; and discarding the successive data packet if the current flow of data packets being forwarded to the server meets or exceeds the generic flow threshold.

In some implementations of the present technology, the method further comprises, if there is an available space in the set of signatures, inserting a new signature matching the predetermined area of the content in the set of signatures; comparing the current flow of data packets being forwarded to the server to the selected one of the destination-based flow threshold and the signature-based flow threshold; forwarding the successive data packet if the current flow of data packets being forwarded to the server is less than the selected one of the destination-based flow threshold and the signature-based flow threshold; and discarding the successive data packet if the current flow of data packets being forwarded to the server meets or exceeds the selected one of the destination-based flow threshold and the signature-based flow threshold.

In some implementations of the present technology, the method further comprises starting a deletion timer for each signature of the set of signatures; following receiving the data packet, restarting the deletion timer for the one of the signatures of the set of signatures that provides a byte-for byte match to the predetermined area of the content; and if a given deletion timer expires, deleting the signature corresponding to the given deletion timer from the set of signatures.

In some implementations of the present technology, the predetermined area of the content is at a start of the content; and each signature has a maximum length to allow its application as a mask in a single processor operation.

In some implementations of the present technology, forwarding the data packet toward the server of the service infrastructure comprises forwarding the data packet to a router; and in the router, using a routing table to route the data packet to the server or to a protection module communicatively coupled to the server.

In some implementations of the present technology, the method further comprises periodically searching for a partial match between the at least some bytes of two signatures of the set of signatures; and in response to detecting the partial match, replacing the two signatures with a new signature containing the at least some bytes forming the partial match.

In other aspects, various implementations of the present technology provide a data packet cleaning system, comprising:
   an input device configured to receive a data packet, the data packet comprising a header and a content;
   a memory device configured to store a set of signatures; and
   a processor operatively connected to the input device and to the memory device, the processor being configured to:
      receive the data packet from the input device,
      read the set of signatures from the memory device,
      successively apply each signature of the set of signatures as a mask to a predetermined area of the content; and
      if there is a byte-for-byte match between the predetermined area of the content and one of the signatures of the set of signatures, take an action corresponding to the one of the signatures, the action being selected from:
         unconditionally forwarding the data packet toward a server of a service infrastructure,
         unconditionally discarding the data packet,
         forwarding the data packet toward the server of the service infrastructure if a current flow of data packets being forwarded to the server is less than a flow threshold, and
         discarding the data packet if the current flow of data packets being forwarded to the server meets or exceeds the flow threshold.

In other aspects, various implementations of the present technology provide a service infrastructure comprising:
   a database; and
   the data packet cleaning system, further comprising an output device, the processor of the data packet cleaning system being operatively connected to the output device, the processor being further configured to:
      cause the output device to send a query to the database for reading the set of signatures,
      receive the set of signatures from the database, via the input device, and
      cause the memory device to store the set of signatures.

In some implementations of the present technology, in the data packet cleaning system, the processor is further configured to periodically search for a partial match between at least some bytes of two signatures of the set of signatures; and in response to detecting the partial match, replace the two signatures with a new signatures containing the at least some bytes forming the partial match.

In other aspects, various implementations of the present technology provide a data packet cleaning system, comprising:
   an input device configured to receive a data packet;
   a processor operatively connected to the input device; and
   a memory device operatively connected to the processor, the memory device being configured to store a set of signatures and comprising non-transitory executable instructions that when executed cause the processor to perform the method for detecting illegitimate data packets at a service infrastructure.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
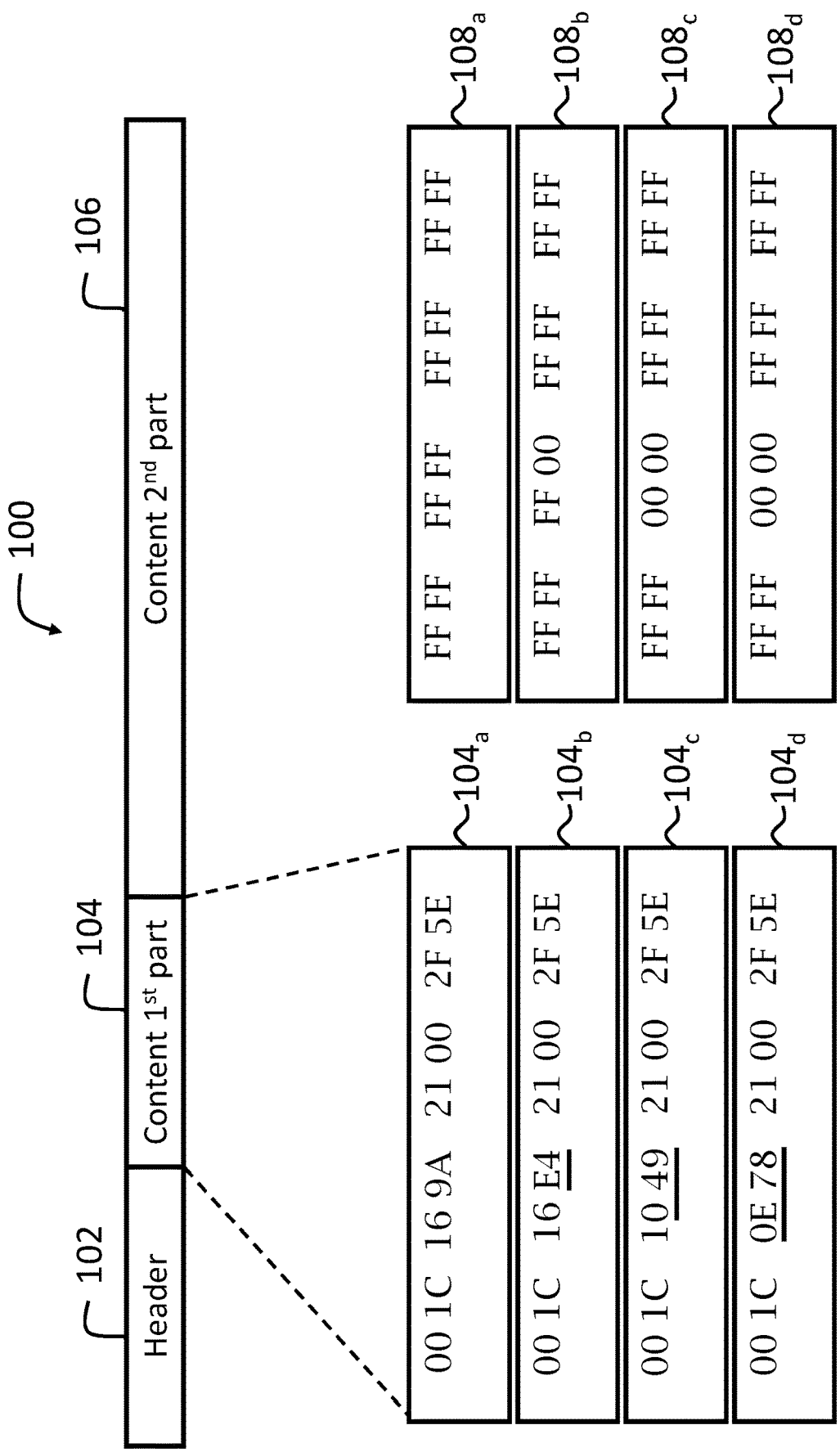
FIG. 1 is a simplified illustration of data packets showing variations of their contents in successive data packets in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect of the present technology, a content of a data packet received at a service infrastructure is examined A mask having a length of a few bytes is applied on a corresponding number of bytes of a predetermined area of the content of a data packet. The mask may for example be applied to the first two (2) to eight (8) bytes of the content of the data packet. This mask is a signature. It may be a signature that is generally found in data packets used by clients to get access to a legitimate service, for example the signature of a command to initialize a gaming session for a game hosted by the service infrastructure. It may alternatively be the signature of a known attack. Such attack signatures are frequently found in illegitimate data packets because the malicious sources of attacks frequently emit substantially identical data packets in a repetitive manner Since the mask is applied on the content of the data packet, which relates to an application hosted by the service infrastructure, it can be said that the technique is applied on an application layer (layer 7) of the Open System Interconnection (OSI) model.

If applying the mask reveals that the content of the data packet carries the signature of a legitimate service, the data packet may be treated normally by the service infrastructure. If the data packet carries the signature of a known attack, that data packet may be discarded. Optionally, data packets having a given repeated or constant part in their contents may be counted, because they may relate to a previously unknown attack. A new signature may eventually be identified if a flow of these data packets exceeds a maximum volume per unit of time, defined by a flow threshold.

A database includes a number of masks that each corresponds to a known signature. This number is fairly small, being for example set to four (4) signatures for a given service hosted by the service infrastructure, the given service being usually identified by a destination address and a destination port carried in a header of the data packet. The number of signatures for the given service is kept small so that all these masks can be rapidly and consistently applied on the contents of received data packets.

An aggregation process may be used to update the knowledge base. It may be found that a newly identified signature is similar to an already known signature. As an example, a new candidate signature may share five (5) octets with a previously known 6-octet signature. The database may be updated to replace the previously known 6-octet signature with the candidate signature having these five (5) octets. This new signature now allows to more broadly detect attacks because it will not be limited by a content of the 6th octet that is no longer part of the updated signature. In an embodiment, the aggregation process may be performed in the background. The aggregation process is not necessarily triggered upon receiving a particular data packet at the service infrastructure.

The present technology may be applied to the detection of illegitimate data packets that arrive at the service infrastructure using various protocols. The present technology has a particular application to the detection of illegitimate data packets using the user datagram protocol (UDP) because this protocol is connection-less. Although the transmission control protocol (TCP) may benefit from existing Internet security solutions, the present technology may still be used to provide additional protection against illegitimate TCP data packets. The following description will refer to applications of the method and system for detecting illegitimate UDP data packets without any intent to limit the generality of the present technology With these fundamentals in place, we will now consider some non-limiting examples to illustrate various implementations of aspects of the present technology.

FIG. 1 is a simplified illustration of data packets showing variations of their contents in successive data packets in accordance with an embodiment of the present technology. A data packet 100 includes a header 102 and a content that includes a first content part 104 and a remaining second content part 106. A format of the header 102 may vary depending on a protocol of the data packet 100. Generally, the header 102 includes an Internet Protocol (IP) (layer 3) header part that specifies a source address, a destination address, and a protocol indicator that may indicate that the data packet is a UDP data packet, a TCP data packet, or a data packet built according to another protocol. The IP header also contains some other fields. The header 102 then contains a layer-4 header part, specific to the protocol such as TCP or UDP. The layer-4 header part may include a source port, a destination port, and some other fields.

If the data packet is legitimate, the source address and the source port designate a network entity that originates the data packet. The destination address may designate a server of the service infrastructure and its combination with the destination port may designate a specific service hosted by the server. Generally, a specific pair combining a given destination address with a given destination port designates a given service. The same service may be designated by other combinations, for example, in cases where distinct ports are used for audio and video data for the same service. This however has no limiting impact on the present technology.

The content of the data packet 100 is shown as the first content part 104 and the remaining second content part 106 to illustrate that the present technology applies the signature related to legitimate services or to malwares near the start of the content of the data packet 100. Although there is no a priori limit to the size of the first content part 104 of the content, in an embodiment, a length of up to eight (8) bytes (or 64 bits) is used for practical reasons that will be explained hereinbelow. In the examples described in relation to FIG. 1, the signature is applied to the first eight (8) bytes of the first content part 104. In another variant, the first content part 104 may be longer than as illustrated, including for example 16 bytes, in which case the signature may be applied on the ninth to sixteenth bytes of the first content part, or to the sixth to thirteenth bytes of the first content part, or to any bytes in the first content part, or to any eight (8) consecutive or non-consecutive bytes of the first content part 104.

On FIG. 1, in a first instance of the data packet 100 received at the service infrastructure, a first content part 104a of the content includes the following eight (8) bytes: 001C 169A 2100 2F5E. This 8-byte sequence may have been identified earlier in the service infrastructure as the signature '001C 169A 2100 2F5E' of a known attack. This signature may have been identified, for example, when the service infrastructure has been flooded with a very large number of data packets having this signature in their first content parts 104. The service infrastructure (or one of its component) applies the signature as a mask on the first content part 104a, performing a byte-for-byte comparison between the signature and the first content part 104a to output a comparison result 108a. If there is a complete byte-for-byte match between the extracted content of the first content part 104a and the signature of the known attack (all bytes are set in the comparison result 108a), this first instance of the data packet 100 is identified as illegitimate and discarded. In a variant, it is contemplated that a bit-for-bit comparison may be performed between the signature and the first content part 104a to output the comparison result 108a. It may be observed that the same or an equivalent process may be used to determine whether a complete byte-for-byte match can be found between the first content part 104a and the signature of a legitimate service.

In a second instance of the data packet 100 received at the service infrastructure, a first content part 104b of the content includes the following bytes: 001C 16E4 2100 2F5E. This sequence is not identical to any of the signatures stored in the service infrastructure because the fourth byte has changed; this fourth byte is underlined on FIG. 1. Applying the same signature (001C 169A 2100 2F5E) on the first content part 104b yields a comparison result 108b in which not all bytes are set. Later instances of the data packet 100 may include first content parts 104*c* and 104*d* having slightly different contents so that applying the same signature (001C 169A 2100 2F5E) yields comparison results 108*c* and 108*d* in which not all bytes are set.

An aggregate process may be used to maintain an up-to-date list of signatures. Although complete matches are not found in the first content parts 104*b*, 104*c* and 104*d*, the comparison results 108*b*, 108*c* and 108*d* still have at least six (6) bytes showing a match between the signature (001C 169A 2100 2F5E) and the first content parts 104*b*, 104*c* and 104*d*. The first content parts 104*a-d* of several received data packets 100 only show slight variations from the signature. Instead of an 8-byte signature, the service infrastructure may elect to use a 6-byte signature applied on the first, second, and fourth to eight bytes of the first content part 104 in view of identifying illegitimate data packets. Therefore, when the service infrastructure has detected a partial match between the content of a data packet 100 and a known signature, the service infrastructure may aggregate first content parts 104 that are similar to an existing signature to form a new candidate signature having a few less bytes. This aggregation process may be performed at least in part in real-time when the partial match is detected, or may be performed as a background operation. In the example of FIG. 1, the candidate signature may be '001C XXXX 2100 2F5E', in which 'XXXX' mean that those bytes are not verified when a new data packet 100 is received, the candidate signature effectively having six (6) bytes. If many received data packets 100 match the candidate signature, the earlier signature (for example 001C 169A 2100 2F5E) may be replaced by the candidate signature (for example 001C XXXX 2100 2F5E).

In the example of FIG. 1, although the first content part 104 of the content is shown for only four (4) data packets 100, it will be understood that the replacement of a signature by a new candidate signature may follow an analysis of a larger number of packets.

Figure 2:
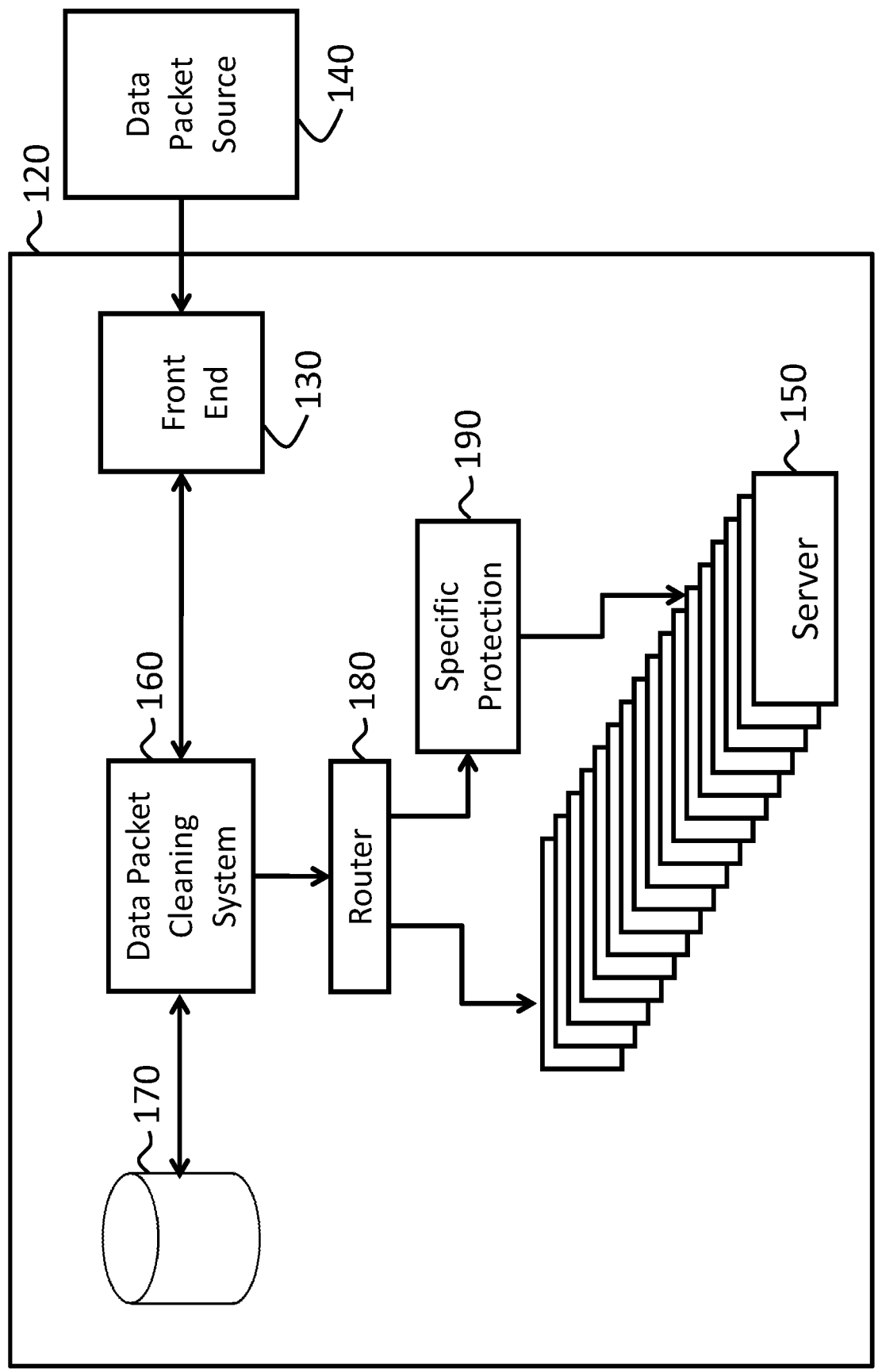
FIG. 2 is a block diagram of a service infrastructure in accordance with an embodiment of the present technology.

FIG. 2 is a block diagram of a service infrastructure in accordance with an embodiment of the present technology. A service infrastructure 120 may include a front-end 130 configured to receive data packets from a data packet source 140, one or more servers 150, a data packet cleaning system 160, and a database 170, and may further include a router 180 and a service-specific protection module 190 for some of the servers 150. The data packets 100 received at the front-end 130 are forwarded to the data packet cleaning system 160 that may discard any traffic that is found to be abusive based on an evaluation of signatures of each data packet 100. The data packet cleaning system 160 forwards data packets 100 that are not discarded to the various servers 150 for processing. In general, each server 150 is identified by a corresponding IP address and is host to one or more services. A given service held on a given server 150 may be identified by the IP address of the given server 150 and by a corresponding port number, the IP address and the port number being the destination address and the destination port obtained from the header 102 of each data packet 100. The data packet cleaning system 160 may route the data packets 100 that are not discarded to the proper servers 150 according to destination addresses in the data packets 100.

Optionally, the data packet cleaning system 160 may route the data packets 100 toward the servers 150 via the router 180. For some services, the router 180 simply forwards the data packets 100 to the appropriate server 150. For some other services, the router 180 may first forward the data packet 100 to the protection module 190 that may drop or forward the data packet 100 to the appropriate server 150 according to some other protection scheme. As a non-limiting example, the protection module 190 may implement an anti distributed denial of service (DDOS) function to protect some of the servers 150 against this specific form of attack.

Figure 3:
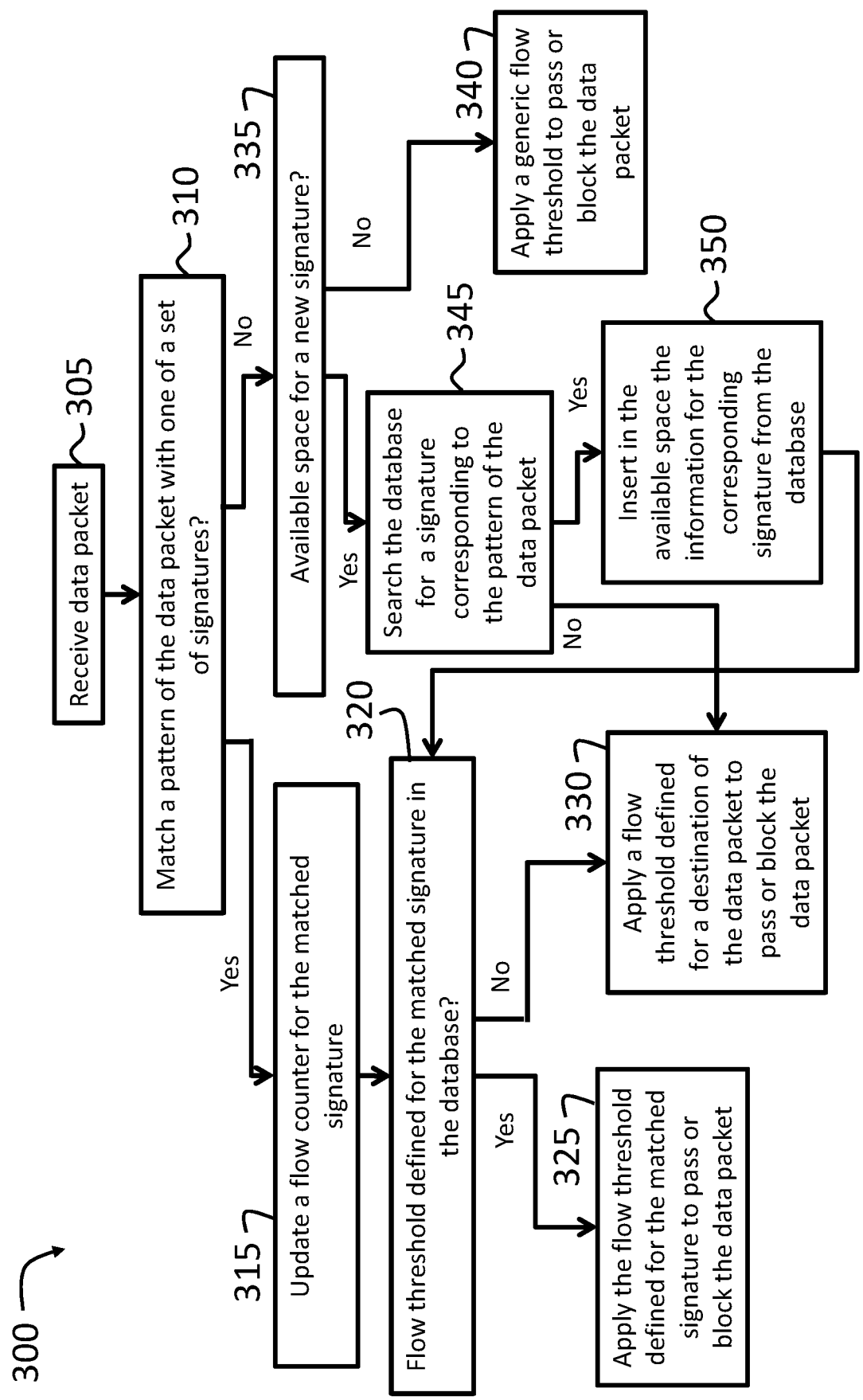
FIG. 3 is a generic sequence diagram showing high-level operations a method for screening data packets received at a service infrastructure in accordance with an embodiment of the present technology.

FIG. 3 is a generic sequence diagram showing high-level operations a method for screening data packets received at a service infrastructure in accordance with an embodiment of the present technology. On FIG. 3, a sequence 300 comprises a plurality of operations that may be executed in variable order, some of the operations possibly being executed concurrently, some of the operations being optional. At operation 305, a data packet is received at the service infrastructure 100, from the data packet source 140, which may be a client of the service infrastructure 100 but could also be a malicious party, such as a hacker. The front-end 130 forwards the data packet to the data packet cleaning system 160. At operation 310, the data packet cleaning system 160 matches a pattern of the data packet with one of a set of signatures defined in the data packet cleaning system 160. The set of signatures may be read from the database 170. If the service infrastructure supports a plurality of distinct services, the data packet cleaning system 160 may use the destination address and the destination port of the data packet to select a particular set of signatures according to a current service for the data packet source 140. If there is a match to one of the signatures of the set, the sequence 300 continues at operation 315 where a flow counter for the matched signature is updated, for example being stepped for each newly received data packet for the current service. This flow counter may count a number of data packets received for the current service over a brief period, for example within a second, and be automatically reset at the end of this brief period so that a volume per period (e.g. a number of data packets per second) is actually counted. A test is made at operation 320 to determine whether a flow threshold has been defined specifically for the matched signature. If so, operation 325 applies the flow threshold defined specifically for the matched signature to pass or block the data packet, depending on the flow counter being less than or greater than that flow threshold. If operation 320 reveals that there is no flow threshold defined for the matched signature, operation 330 may apply a flow threshold defined specifically for the current service to pass or block the data packet. In operations 325 and 330, if the data packet is blocked, the data packet cleaning system 160 discards the data packet. Otherwise, the data packet cleaning system 160 forwards data packet to the appropriate server 150 for the current service.

It may be noted that the flow threshold defined specifically for the matched signature applied at operation 325 and/or the flow threshold defined specifically for the current service applied at operation 330 may be expressed as a number of data packets per period, for example to a number of data packets per second, this number being for example set as low as zero (0) or one (1) data packet per second or set to any higher number, depending on particular circumstances that are useful to protect the service infrastructure 100 against malicious attacks. If the matched signature is the known signature of an attack, the flow threshold may be set to a low value, for example to zero (0) data packet per second, so that few or no malicious data packets are passed on to the servers 150. If the matched signature is the known signature of the current service, the flow threshold may be set to a higher value.

Without limitation, the flow threshold for the known signature of a legitimate service may be set to infinity, in which case all data packets matching this known signature are passed on by the data packet cleaning system 160 for the legitimate service. In a non-limiting example, an infinite flow threshold may be selected when the protection module 190 protects the server 150 for the legitimate service against specific attacks.

Returning to operation 310, if the data packet cleaning system 160 does not find a match between the pattern of the data packet and one of the set signatures defined in the data packet cleaning system 160, a test is made at operation 335 to determine whether there is available space in the set of signatures for the current service—as mentioned hereinabove, the set of signatures is limited in size so that the complete set can rapidly be tested against the pattern of the data packet. If there is no available space, the sequence continues at operation 340 where a generic flow threshold, defined for the current service or for the service infrastructure 100 as a whole, is used to determine whether to pass the data packet on to the appropriate server 150 for the current service or to block and discard the data packet at the data packet cleaning system 160. This generic flow threshold may be used to protect the service infrastructure 100 against massive attacks such as those in which one of more data packet sources 140 flood the service infrastructure 100 with data packets that cannot be matched to any known signature.

If, at operation 335, there is available space in the set of signatures, a search is made in the database 170, at operation 345, for a signature defined in another set of signatures for another service that corresponds to the pattern of the current data packet. A known signature of an attack that has previously been identified in relation to another service and stored in the database 170 may match the pattern of the current data packet related to the current service. That could be the case, for example, when a hacker attempts to attack the current service with the same or equivalent means as previously used to attack the other service. If a signature is found in the database 170 that matches the pattern of the data packet, the found signature is inserted in the available space in the set of signatures at operation 350. It should be noted that operation 350 may be executed whether the found signature relates to an attack or to legitimate data traffic for a legitimate service, as the same process is used in either cases. Information contained in the database 170 for the found signature, including for example any flow threshold specifically defined for that signature, is noted in relation to the new signature entered in the set of signatures. After operation 350, the sequence 300 continues at operation 320.

If no signature matching the pattern of the data packet is found in the database 170 at operation 345, the sequence 300 continues at operation 330 where the data packet is passed on to the appropriate server 150 for the current service, or dropped, according to the flow threshold defined specifically for the current service.

FIG. 3 does not illustrate all of the possible outcomes of the search for patterns in data packets received at the service infrastructure. Additional non-limiting examples are provided in relation to FIGS. 4a-4i, which form a sequence diagram showing operations of a method for detecting illegitimate data packets at a service infrastructure in accordance with an embodiment of the present technology. On FIGS. 4a-4i, a sequence 200 comprises a plurality of operations that may be executed in variable order, some of the operations possibly being executed concurrently, some of the operations being optional. The various operations of the sequence 200 show how signatures may be created, applied, aggregated and/or eventually deleted, in view of traffic received over time at the service infrastructure 120. In the FIGS. 4a-4i, references A, B, C, D, E and F indicate examples of how various operations may be followed by other operations within the sequence 200. The various operations of the sequence 200 may follow a different order.

The service infrastructure 120 may define a single set of signatures for all clients hosted on all of its servers 150. This may for example be the case for a relatively small service infrastructure 120 hosting a single service on a single server 150, or a small number of services on one or a few servers 150. Alternatively, distinct sets of signatures may be defined for each service hosted by the service infrastructure 120 or for a group of services hosted by the service infrastructure 120. The relevant set of signatures that will be applied to determine whether a received data packet will be accepted or discarded may be selected based a particular hosted service identified by a destination address and a destination port in the header of the received data packet. It is contemplated that a set of signatures may be defined for a group of destination addresses, or based on historical observations made while processing earlier received data packets.

The service infrastructure 120 may search for the signatures of a set in a large number of received data packets. In order to limit the amount of processing caused by these operations, a number of signatures in a set of signatures may be kept small, a set having for example up to four (4) signatures. A length of the signatures may be limited for the same reasons, this length being selected so that the data packet cleaning system 160 may apply each signature on a received data packet in a single processor operation.

The sequence 200 may start at operation 202 where a plurality of sets of signatures is stored in the database 170. Each set of signature is stored based on a destination address and a destination port that, together, identify a service hosted in a server of the service infrastructure. At operation 204, a specific action may be associated in the database 170 in relation to each signature of the sets of signatures. Some signatures may be defined by an operator of the service infrastructure 120, for example and without limitation when the operator defines the signature of a legitimate data packet for a service hosted in the infrastructure 120. Likewise, the operator may define that the specific action for a legitimate signature is to unconditionally allow a data packet with that signature, or to allow the data packet unless a high flow threshold is exceeded. The operator may assign in the database 170 a low flow threshold for data packets having a suspicious signature, or even set such threshold to zero (0), in which case data packets having the suspicious signature will be unconditionally discarded. A deletion timer is started for each signature of the set of signatures at operation 206. Without limitation, the deletion timer may be set to a brief period, for example two (2) seconds, so that a signature that does not appear in any data packet received within this brief period will rapidly be automatically deleted from the set of signatures. Handling of the timer and of the automatic deletion may be performed in the database 170, in the data packet cleaning system 160, or in another element of the service infrastructure 120.

A data packet is received at the service infrastructure at operation 208, more particularly at the data packet cleaning system 160. The data packet comprising a content as illustrated in FIG. 1. A set of signatures is selected by the data packet cleaning system 160 at operation 210, the selection being made among the plurality of sets of signatures stored in the database 170, this selection being based on a destination address and a destination port identified in a header of the data packet, the destination address and the destination port together identifying a service hosted in the service infrastructure. Then at operation 212, each signature of the selected set of signatures is successively applied by the data packet cleaning system 160 as a mask to a predetermined area of the content. In an embodiment, the predetermined area of the content is at a start of the content. In the same or another embodiment, each signature has a maximum length to allow its application as a mask to the predetermined area of the content in a single processor operation. In the same or yet another embodiment, the set of signatures may contain four (4) signatures.

At operation 214, the data packet cleaning system 160 verifies whether a byte-for-byte match is found between the predetermined area of the content and one of the signatures of the set of signatures. If such a byte-for-byte match is found, the deletion timer for the one of the signatures of the set of signatures that provides a byte-for byte match to the predetermined area of the content is restarted at operation 216. Because the byte-for-byte match has been found for one of the signatures at operation 214, an action is selected by the data packet cleaning system 160 at operation 218, the action corresponding to the one of the signatures. The data packet cleaning system 160 may unconditionally forward the data packet toward an appropriate server 150 for the identified hosted service at operation 220, forward the data packet toward the appropriate server 150 at operation 222 if a current flow of data packets being forwarded to the appropriate server 150 is less than a flow threshold, unconditionally discard the data packet at operation 224, or discard the data packet at operation 226 if the current flow of data packets being forwarded to the appropriate server 150 meets or exceeds the flow threshold. The flow threshold applied at operations 222 and 226 may be a signature-based flow threshold defined for the one of the signatures for which a match has been found at operation 214. If no match has been found at operation 214, a destination-based flow threshold defined for the destination address and the destination port may be applied instead. In a non-limiting example, the signature-based flow threshold may be set to 25K packets per second and the destination-based flow threshold may be set to 30K packets per second.

If the data packet is discarded at operation 224 or 226, the sequence 200 may end. If the data packet is not discarded, operation 220 or 222 may optionally be following by operation 228 in which the data packet cleaning system 160 forwards the data packet to the router 180. Then at operation 230, the router 180 may apply the destination address from the header of the data packet to an internal routing table to route the data packet directly to the appropriate server 150 or to the protection module 190 that is, in turn, communicatively coupled to the appropriate server 150. Whether the data packet is forwarded from the data packet cleaning system 160 directly to the appropriate server 150 or via the router 180, the sequence 200 for the treatment of the received data packet may end.

Returning to operation 214, if no byte-for-byte match is found between the predetermined area of the content and any one of the signatures of the set of signatures, the sequence 200 continues at operation 232 where it is determined if there is an available space in the set of signatures. If there is an available space in the set of signatures, at operation 234, the data packet cleaning system 160 searches in the database 170 for an existing signature matching the predetermined area of the content. If such existing signature is found, at operation 236, the data packet cleaning system 160 causes to insert the existing signature in the available space in the set of signatures. If no existing signature is found, at operation 238, the data packet cleaning system 160 inserts a new signature in the set of signatures, the new signature being defined by the predetermined area of the content of the data packet. Operations 236 and 238 lead to slightly different results in that insertion of the existing signature in the set of signatures at operation 236 may involve the use of a flow threshold defined specifically for that signature, as discussed hereinabove in the description of operations 320 and 325 (FIG. 3). In either case, a deletion timer is initialized for the new signature at operation 240 so that the new signature may eventually be deleted if not frequently discovered in later data packets. At operation 242, the data packet cleaning system 160 causes to forward or discard the data packet based on the selected one of the destination-based flow threshold and the signature-based flow threshold. The sequence 200 for handling of the data packet ends after operation 242.

If operation 232 determines that there is no available space in the set of signatures, the data packet cleaning system 160 may determine at operation 244 whether the current flow of data packets forwarded to the server is less than a generic flow threshold. If so, the data packet cleaning system 160 causes to forward the data packet toward the appropriate server 150 at operation 246. Otherwise, the generic flow threshold having been exceeded, the data packet cleaning system 160 may discard the data packet at operation 248. The sequence 200 ends after operation 246 or 248. In a non-limiting example, the generic flow threshold may be set to 75 thousand packets per second.

In an embodiment, further operations of the sequence 200 may be used to generate a deletion sequence for unused signatures and an aggregation sequence for similar signatures. These further operations may be executed in the background and may not be in response to the receipt of any particular data packet at the service infrastructure 120.

Figure 4A:
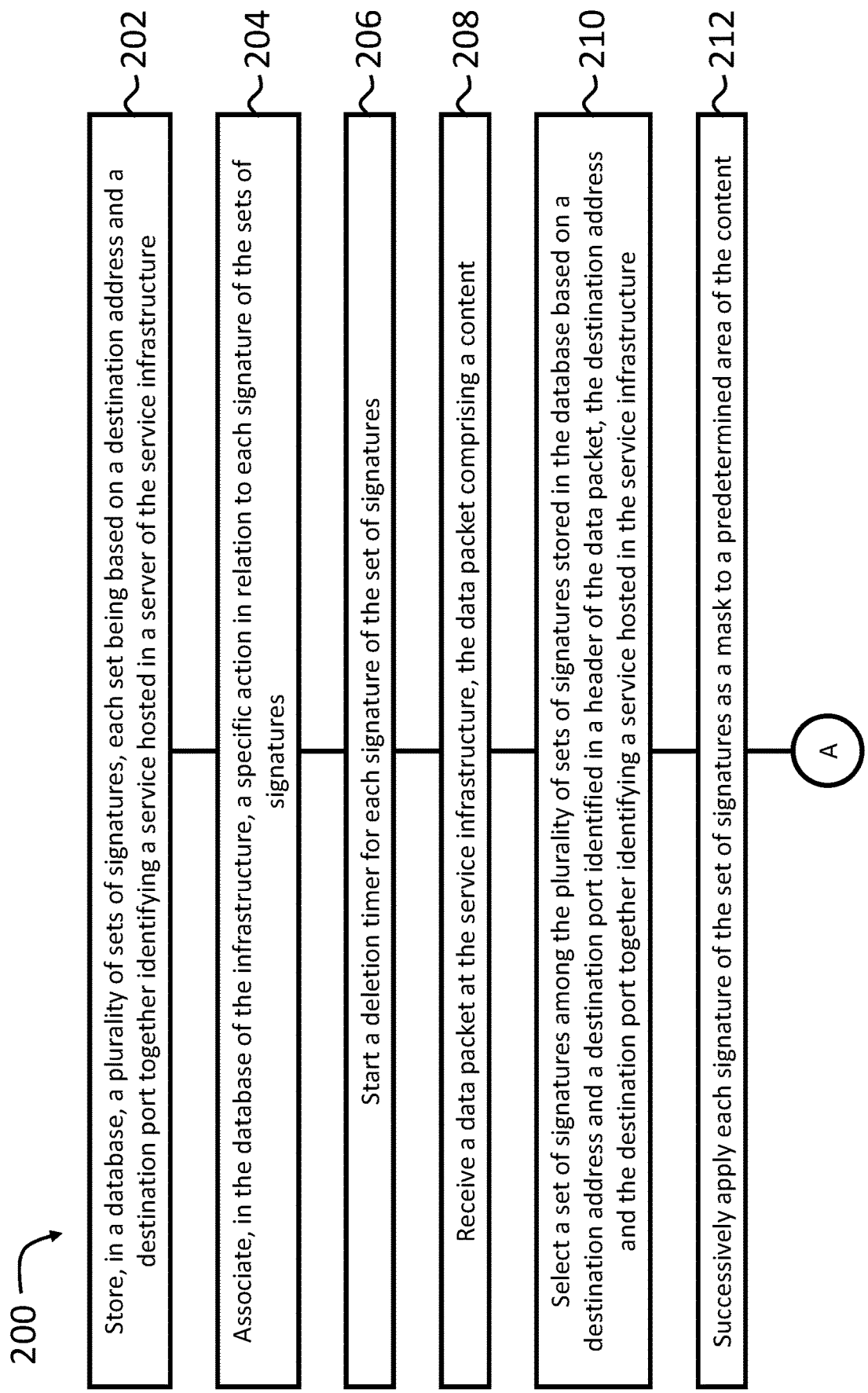
FIGS. 4a-4i form a sequence diagram showing operations of a method for screening data packets received at a service infrastructure in accordance with an embodiment of the present technology.
Figure 4B:
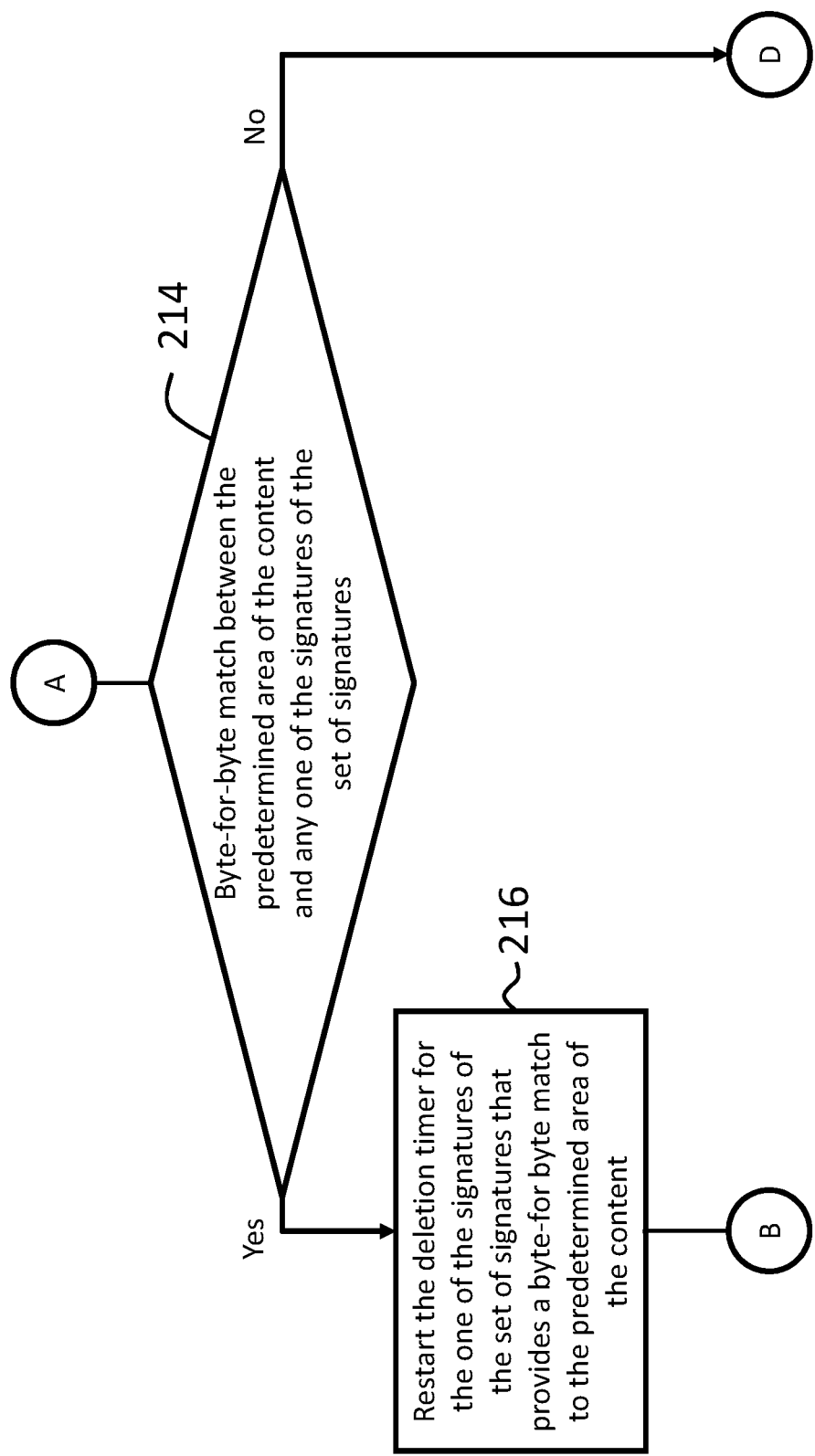
Figure 4C:
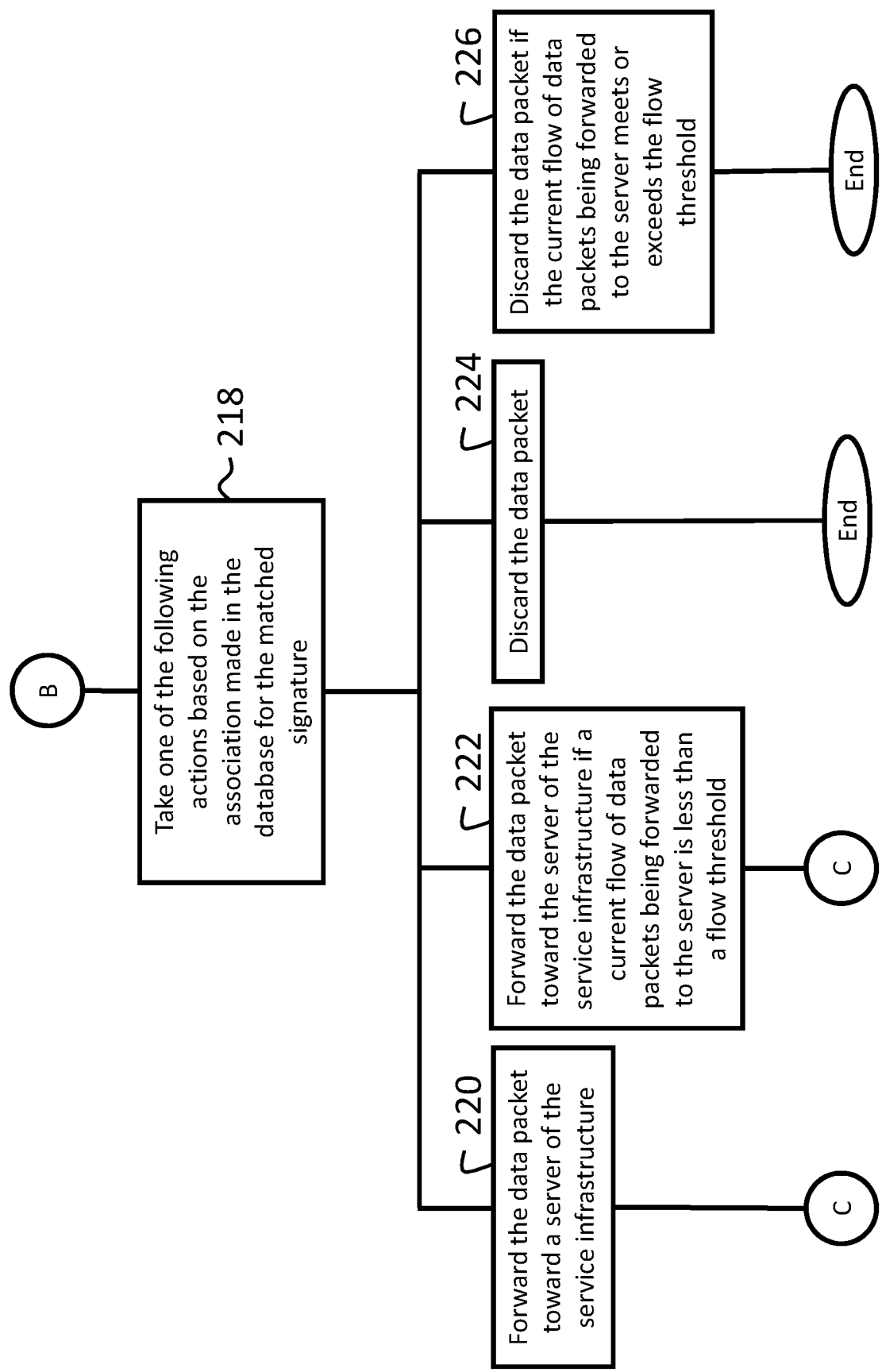
Figure 4D:
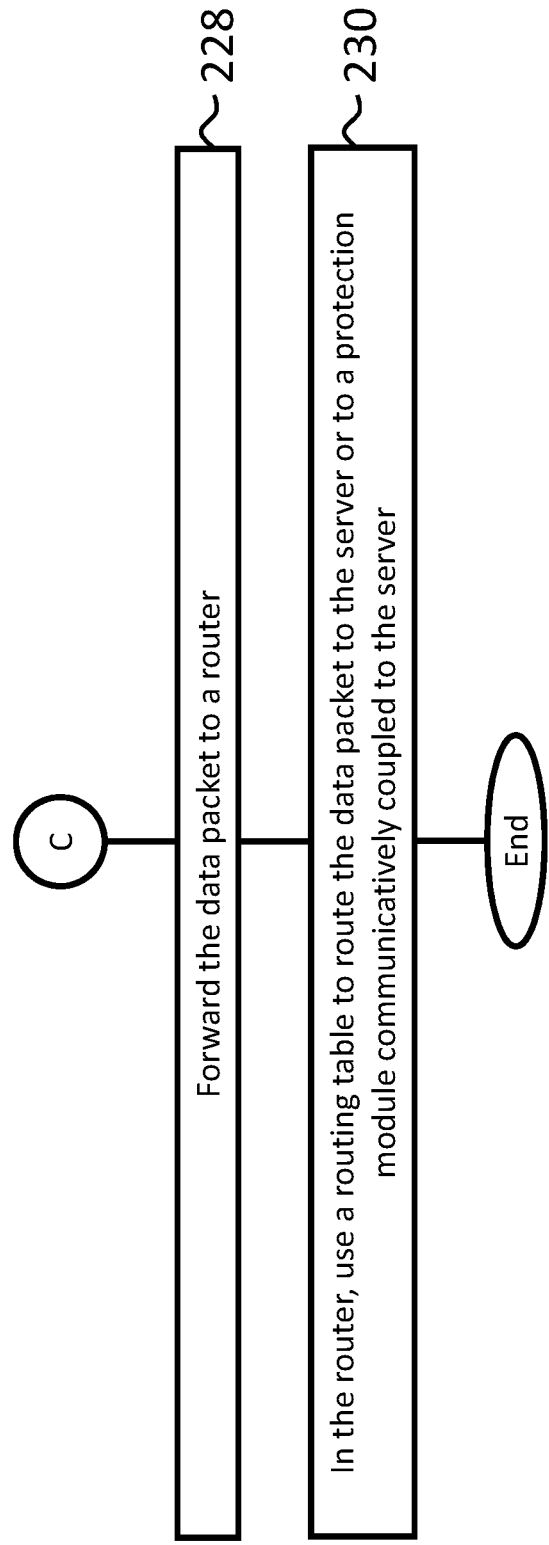
Figure 4E:
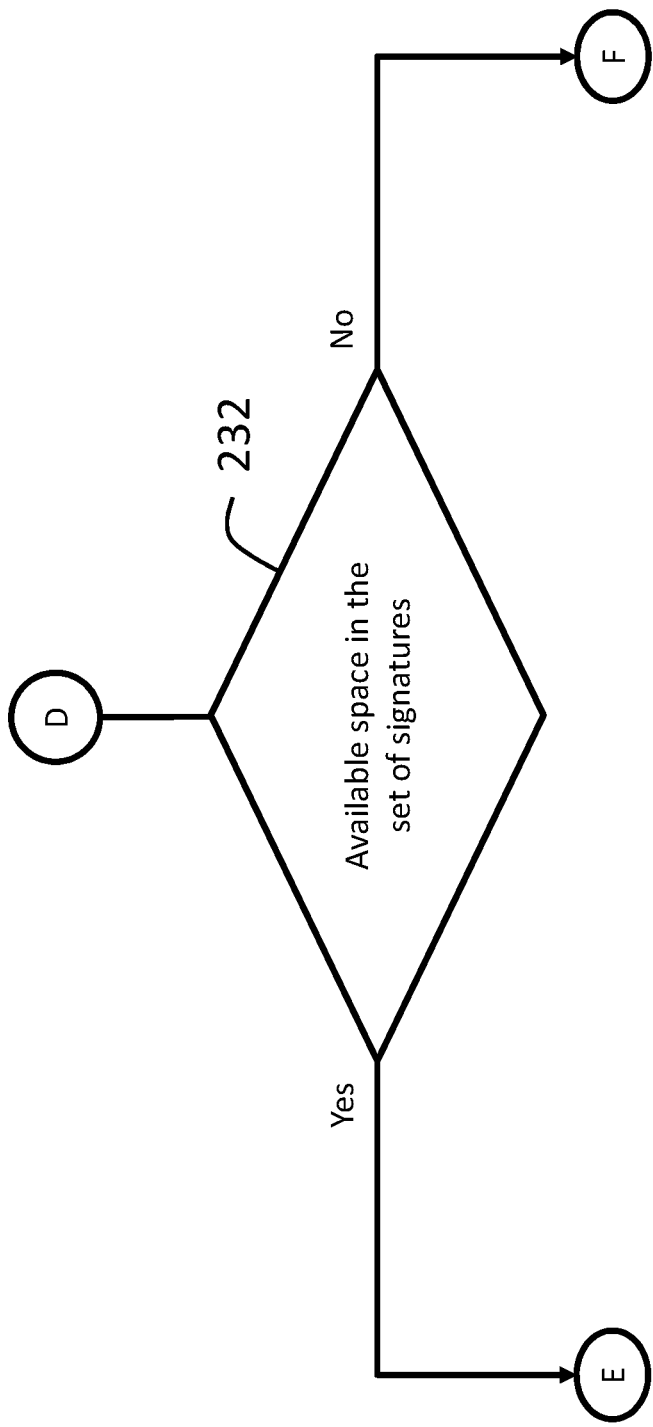
Figure 4F:
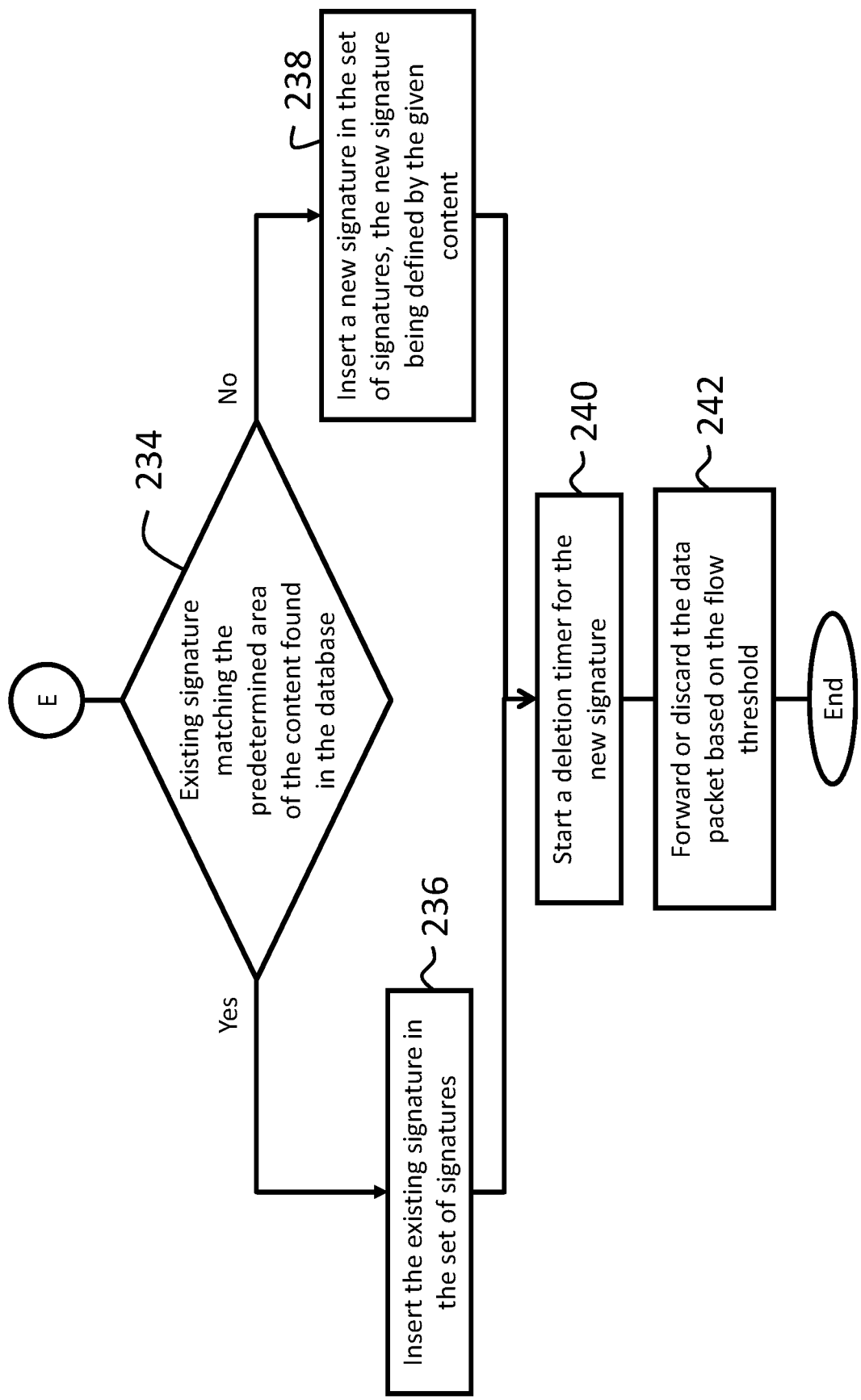
Figure 4G:
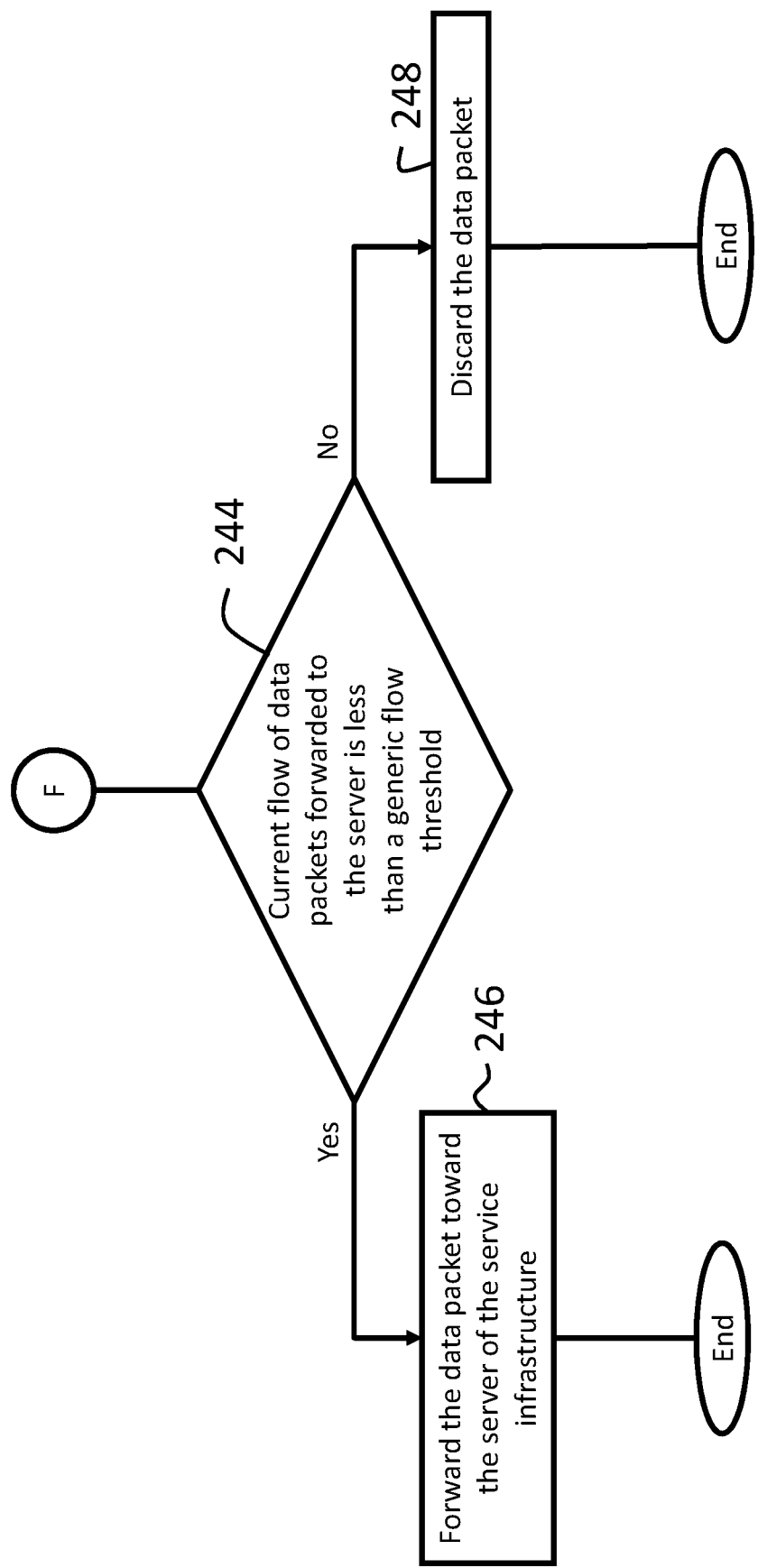
Figure 4H:
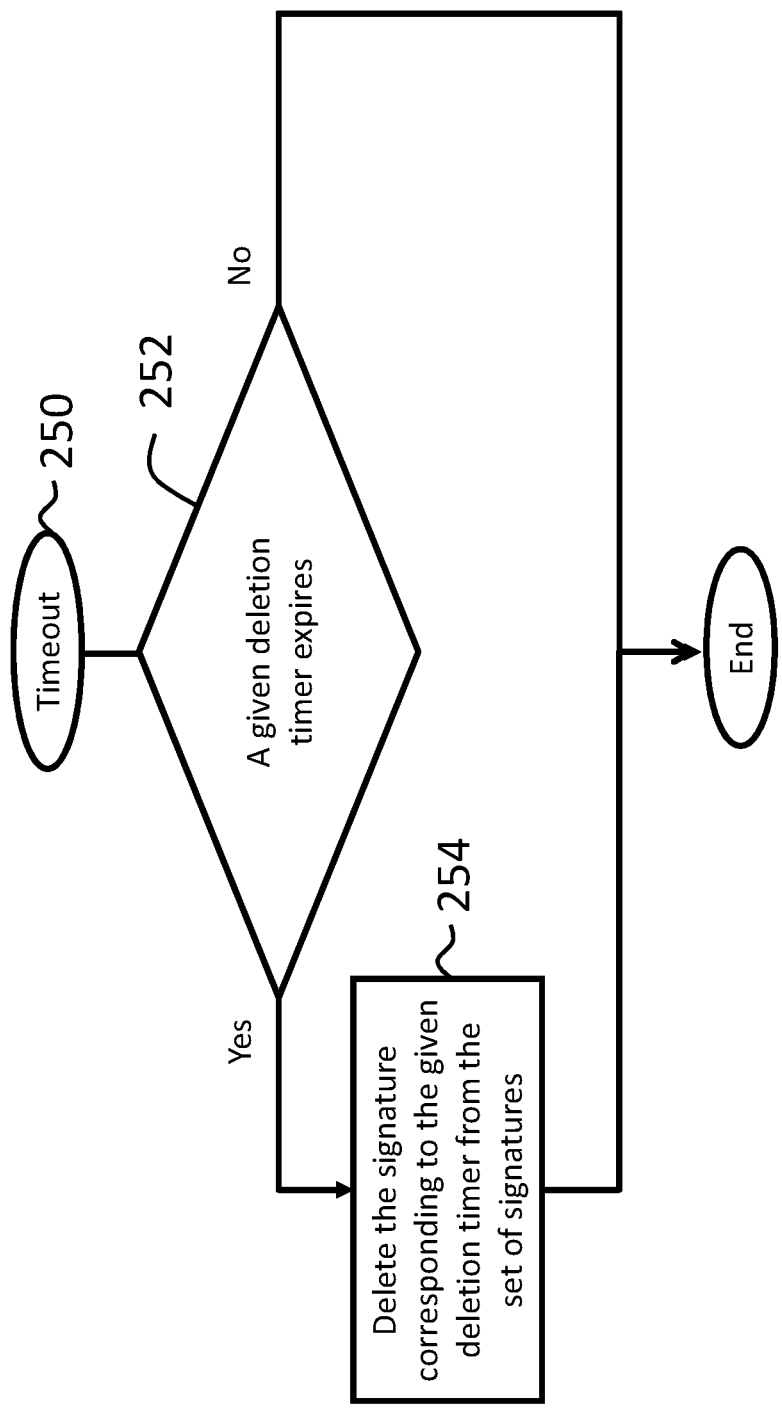
Figure 4I:
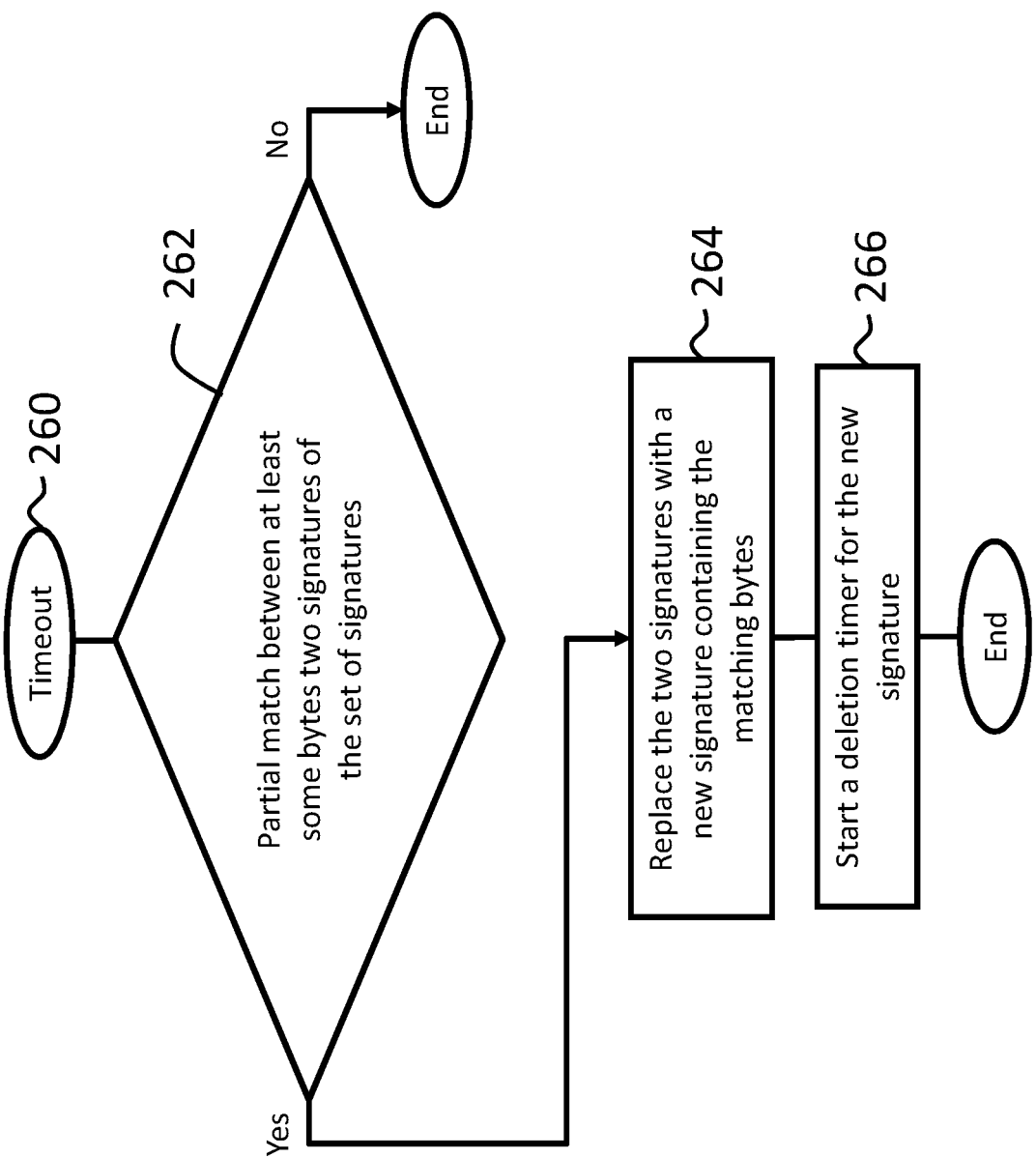

As shown on FIG. 4h, a timeout 250 or a similar trigger may be detected in the data packet cleaning system 160. The timeout 250 may occur once per second or at any other suitable time interval. When the data packet cleaning system 160 detects the timeout 250, it verifies at operation 252 whether a deletion timer has expired for any one of the signatures stored in the database 170. If so, the signature corresponding to the expired deletion timer is deleted at operation 254 and the deletion sequence ends. Operations 252 and 254 may be repeated for any number of signatures stored in the database 170. In a variant, the timeout 250 may be autonomously detected in the database 170 and expired signatures may be deleted without intervention from the data packet cleaning system 160.

Another periodic timeout 260 that may occur for example once per second triggers the aggregation sequence for some of the signatures. At operation 262, a search is made for a partial match between at least some bytes of two signatures of a given set of signatures. In this context, in a non-limiting embodiment, a partial match may be considered sufficient if a majority of the bytes of a signature of the set is found in another signature of the set. For example, if a signature includes 7 bytes and if a match is found in another signature for 5 of these 7 bytes, a partial match is deemed having been detected. If no partial match is detected, the aggregation sequence ends. The number of matching bytes sufficient for the detection of a partial match may be set to any value up to the maximum signature size.

In response to the detection of a partial match at operation 262, operation 264 replaces the two (2) partially matching signatures with a new signature that contains the matching bytes. A deletion timer is initialized for the new signature at operation 266, so that the new signature may eventually be deleted if not frequently discovered in later data packets. The aggregation sequence then ends. Operations 262, 264 and 266 may be repeated for any number of signatures stored in the database 170. In a variant, the timeout 260 may be autonomously detected in the database 170 and signatures may be aggregated without intervention from the data packet cleaning system. While some of the signatures may possibly be aggregated, some other may not. In an embodiment, signatures that are based on suspicious data packets may be aggregated while signatures of legitimate traffic may not be subject to any aggregation.

Figure 5:
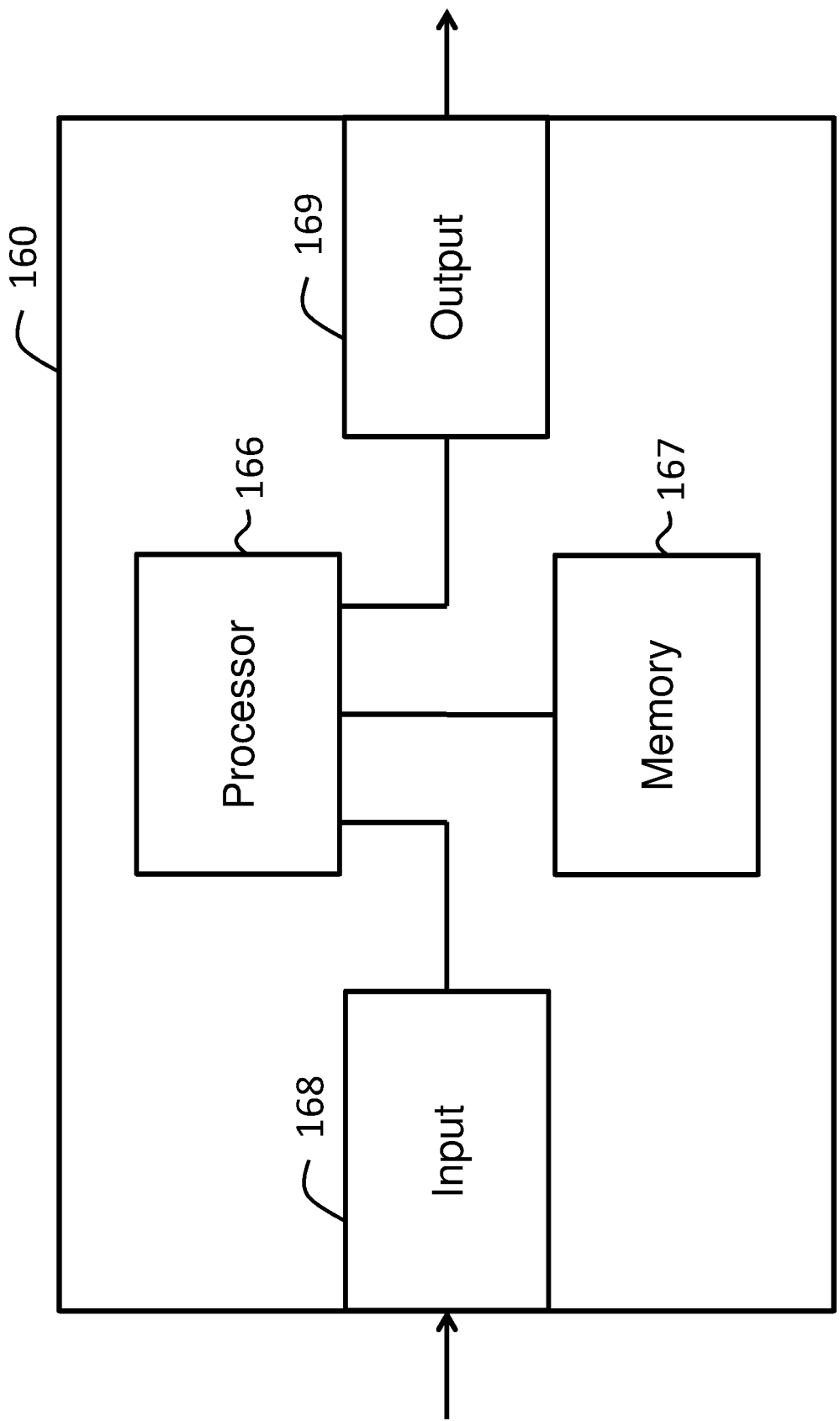
FIG. 5 is a block diagram of a data packet cleaning system of the service infrastructure in accordance with an embodiment of the present technology.

Each of the operations of the sequences 200 and 300 may be processed by one or more processors, the one or more processors being coupled to a memory device. For example, FIG. 5 is a block diagram of a data packet cleaning system of the service infrastructure in accordance with an embodiment of the present technology. On FIG. 5, the data packet cleaning system 160 includes a processor or a plurality of cooperating processors (represented as a processor 166 for simplicity), a memory device or a plurality of memory devices (represented as a memory device 167 for simplicity), an input device or a plurality of input devices (represented as an input device 168) and an output device or a plurality of output devices (represented as an output device 169). The input device 168 and the output device 169 may be combined in an input/output device. The processor 166 is operatively connected to the memory device 167, to the input device 168 and to the output device 169. Without limitation, the processor 166 may be a 64-bit processor capable of performing a masking operation by applying an 8-byte signature to the predetermined area of the content of a received data packet in a single processor operation. The memory device 167 either stores a single set of signatures or may alternatively store a set of signatures for each service hosted on a server 150 of the service infrastructure 120, each service being identified by a specific combination of a destination address with a destination port. The memory device 167 may comprise a non-transitory computer-readable media for storing instructions that are executable by the processor 166. Execution of the instructions by the processor 166 may cause the data packet cleaning system 160 to execute the operations attributed to the data packet cleaning system 160 in the sequences 200 and/or 300.

The data packet cleaning system 160 may include a plurality of other elements that do not need to be discussed herein. Although the data packet cleaning system 160 may be part of the service infrastructure 120, in an embodiment, the features of the present data packet cleaning system 160 may be incorporated in a server operating as a stand-alone unit.

The input device 168 may receive a data packet from the front-end 130. The processor 166 receives the data packet from the input device 168 and reads the set of signatures from the memory device 167. If the memory device 167 stores a plurality of sets of signatures, the processor 166 may read a destination address and a destination port contained in the data packet in order to identify a specific service hosted by the infrastructure 120. In such case, the processor 166 may read from the memory device 167 a set of signatures that is related to the hosted service identified by the destination address and the destination port. Regardless, the processor 166 then successively applies each signature of the set of signatures as a mask to a predetermined area of a content of the data packet. If there is a byte-for-byte match between the predetermined area of the content and any one of the signatures of the set of signatures, the processor 166 may read from the memory 167 a specific action to be taken for the signature for which the match is found. The processor 166 may cause the output device 169 to unconditionally forward the data packet toward an appropriate server 150 of the service infrastructure 120, cause the data packet to be unconditionally discarded, cause the output device 169 to forward the data packet toward the appropriate server 150 if a current flow of data packets being forwarded to the server is less than a flow threshold, or cause the data packet to be discarded if the current flow of data packets being forwarded to the server meets or exceeds the flow threshold.

The processor 166 may cause the output device 169 to send a query to the database 170 for reading one or more sets of signatures for any one or for all of the services hosted in the service infrastructure 120. The set or sets of signatures are received at the input device 168, from the database 170, and forwarded to the processor 166 that, in turn, causes their storage in the memory device 167. This operation may be performed in the background so that the set or sets of signatures are readily available in the memory device 167 when a data packet is received at the data packet cleaning system 160.

The processor 166 may periodically search for a partial match between at least some bytes of two signatures of the a given of signatures. In response to detecting the partial match, the processor 166 may replace the two signatures with a new signatures containing the at least some bytes forming the partial match. More than one such aggregation may take place among the signatures of a given set of signatures.

The processor 166 may cause the output device 169 to forward the new signature to the database 170.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for screening data packets received at a service infrastructure, comprising:
    receiving a data packet at the service infrastructure, the data packet comprising a header and a content, the header identifying a destination address and a destination port designating a server of the service infrastructure, the destination address and the destination port together identifying a service hosted in the service infrastructure;
    successively applying each signature of a set of signatures as a mask to a predetermined area of the content;
    if there is a byte-for-byte match between the predetermined area of the content and one of the signatures of the set of signatures, taking an action corresponding to the one of the signatures, the action being selected from:
        unconditionally forwarding the data packet toward the server of the service infrastructure, unconditionally discarding the data packet,
forwarding the data packet toward the server of the service infrastructure if a current flow of data packets being forwarded to the server is less than a flow threshold, and
discarding the data packet if the current flow of data packets being forwarded to the server meets or exceeds the flow threshold;
receiving a successive data packet at the service infrastructure, the successive data packet comprising a successive header and a successive content, the successive header containing the destination address designating the server;
successively applying each signature of the set of signatures as a mask to a predetermined area of the successive content; and
if there is no byte-for-byte match between the predetermined area of the successive content and one of the signatures of the set of signatures, determining if there is an available space in the set of signatures.

2. The method of claim 1, further comprising associating, in a database of the infrastructure, a specific action in relation to each signature of the set of signatures.

3. The method of claim 2, further comprising selecting the set of signatures among a plurality of sets of signatures stored in the database based on the destination address and the destination port identified in the header of the data packet.

4. The method of claim 1, wherein the flow threshold is selected from a destination-based flow threshold for the destination address and the destination port and a signature-based flow threshold for the one of the signatures.

5. The method of claim 1, further comprising, if there is no available space in the set of signatures:
comparing the current flow of data packets being forwarded to the server to a generic flow threshold;
forwarding the successive data packet toward the server of the service infrastructure if the current flow of data packets being forwarded to the server is less than the generic flow threshold; and
discarding the successive data packet if the current flow of data packets being forwarded to the server meets or exceeds the generic flow threshold.

6. The method of claim 1, further comprising, if there is an available space in the set of signatures:
inserting a new signature matching the predetermined area of the content in the set of signatures;
comparing the current flow of data packets being forwarded to the server to the selected one of the destination-based flow threshold and the signature-based flow threshold;
forwarding the successive data packet if the current flow of data packets being forwarded to the server is less than the selected one of the destination-based flow threshold and the signature-based flow threshold; and
discarding the successive data packet if the current flow of data packets being forwarded to the server meets or exceeds the selected one of the destination-based flow threshold and the signature-based flow threshold.

7. The method of claim 1, further comprising:
starting a deletion timer for each signature of the set of signatures;
following receiving the data packet, restarting the deletion timer for the one of the signatures of the set of signatures that provides a byte-for-byte match to the predetermined area of the content; and
if a given deletion timer expires, deleting the signature corresponding to the given deletion timer from the set of signatures.

8. The method of claim 1, wherein:
the predetermined area of the content is at a start of the content; and
each signature has a maximum length to allow its application as a mask in a single processor operation.

9. The method of claim 1, wherein forwarding the data packet toward the server of the service infrastructure comprises:
forwarding the data packet to a router; and
in the router, using a routing table to route the data packet to the server or to a protection module communicatively coupled to the server.

10. The method of claim 1, further comprising:
periodically searching for a partial match between the at least some bytes of two signatures of the set of signatures; and
in response to detecting the partial match, replacing the two signatures with a new signature containing the at least some bytes forming the partial match.

11. A data packet cleaning system, comprising:
an input device configured to receive a data packet;
a processor operatively connected to the input device; and
a memory device operatively connected to the processor, the memory device being configured to store a set of signatures and comprising non-transitory executable instructions that when executed cause the processor to perform the method as defined in claim 1.

12. A data packet cleaning system, comprising:
an input device configured to receive data packets, the each data packet comprising a header and a content, the header identifying a destination address and a destination port designating a server of a service infrastructure, the destination address and the destination port together identifying a service hosted in the service infrastructure;
a memory device configured to store a set of signatures; and
a processor operatively connected to the input device and to the memory device, the processor being configured to:
receive a first data packet from the input device,
read the set of signatures from the memory device,
successively apply each signature of the set of signatures as a mask to a predetermined area of the content of the first data packet; and
if there is a byte-for-byte match between the predetermined area of the content of the first data packet and one of the signatures of the set of signatures, take an action corresponding to the one of the signatures, the action being selected from:
unconditionally forwarding the first data packet toward the server of the service infrastructure,
unconditionally discarding the first data packet,
forwarding the first data packet toward the server of the service infrastructure if a current flow of data packets being forwarded to the server is less than a flow threshold, and
discarding the first data packet if the current flow of data packets being forwarded to the server meets or exceeds the flow threshold;
receive a successive data packet from the input device, the successive data packet comprising a successive header and a successive content, the successive header containing the destination address designating the server;

successively apply each signature of the set of signatures as a mask to a predetermined area of the successive content; and if there is no byte-for-byte match between the predetermined area of the successive content and one of the signatures of the set of signatures, determine if there is an available space in the set of signatures.

13. A service infrastructure comprising:

a database; and a data packet cleaning system as defined in claim 12, the data packet cleaning system further comprising an output device;

wherein, in the data packet cleaning system, the processor is operatively connected to the output device, the processor being further configured to:

cause the output device to send a query to the database for reading the set of signatures, receive the set of signatures from the database, via the input device, and cause the memory device to store the set of signatures.

14. The service infrastructure of claim 13, wherein in the data packet cleaning system, the processor is further configured to:

periodically search for a partial match between at least some bytes of two signatures of the set of signatures; and in response to detecting the partial match, replace the two signatures with a new signature containing the at least some bytes forming the partial match.

15. The data packet cleaning system of claim 12, wherein the processor is further configured to, if there is no available space in the set of signatures:

compare the current flow of data packets being forwarded to the server to a generic flow threshold;

forward the successive data packet toward the server of the service infrastructure if the current flow of data packets being forwarded to the server is less than the generic flow threshold; and discard the successive data packet if the current flow of data packets being forwarded to the server meets or exceeds the generic flow threshold.

16. The data packet cleaning system of claim 12, wherein the processor is further configured to, if there is an available space in the set of signatures:

insert in the memory a new signature matching the predetermined area of the content in the set of signatures;

compare the current flow of data packets being forwarded to the server to the selected one of a destination-based flow threshold for the destination address and a signature-based flow threshold for the one of the signatures;

forward the successive data packet if the current flow of data packets being forwarded to the server is less than the selected one of the destination-based flow threshold and the signature-based flow threshold; and discard the successive data packet if the current flow of data packets being forwarded to the server meets or exceeds the selected one of the destination-based flow threshold and the signature-based flow threshold.

* * * * *

UNITED STATES PATENT AND TRADEMARK OFFICE
CERTIFICATE OF CORRECTION

PATENT NO. : 11,411,986 B2
APPLICATION NO. : 16/674821
DATED : August 9, 2022
INVENTOR(S) : Aurélien Dudouit Page 1 of 1

It is certified that error appears in the above-identified patent and that said Letters Patent is hereby corrected as shown below:

In the Claims

Column 18, Claim 12, Lines 32-33 should read --an input device configured to receive data packets, each data packet comprising a--

Signed and Sealed this
Fourth Day of October, 2022

Katherine Kelly Vidal
*Director of the United States Patent and Trademark Office*